United States Patent
Kliskey

[19]

[11] Patent Number: 6,145,566

[45] Date of Patent: Nov. 14, 2000

[54] CENTER POST TIRE CHANGING APPARATUS

[75] Inventor: Roger Kliskey, Brimfield, Ohio

[73] Assignee: Summit Tool Company, Akron, Ohio

[21] Appl. No.: 09/182,143

[22] Filed: Oct. 29, 1998

[51] Int. Cl.[7] .............................................. B60C 25/132
[52] U.S. Cl. ........................ 157/1.17; 157/1.24; 157/14; 157/21
[58] Field of Search .................. 157/1.1, 1.17, 157/1.2, 1.22, 1.24, 1.3, 1.5, 4, 14, 16, 17, 21

[56] References Cited

U.S. PATENT DOCUMENTS

| | | | |
|---|---|---|---|
| 1,538,875 | 5/1925 | Stevens . | |
| 2,534,515 | 12/1950 | Henderson | 157/1.24 |
| 2,602,494 | 7/1952 | Larson | 157/1.17 |
| 2,746,528 | 5/1956 | Damman | 157/1.26 |
| 2,825,395 | 3/1958 | Twiford | 157/1.28 |
| 2,873,777 | 2/1959 | Thostenson | 144/288 |
| 2,888,064 | 5/1959 | Coxworth | 157/1.24 |
| 3,008,512 | 11/1961 | Foster | 157/1.28 |
| 3,056,449 | 10/1962 | Foster | 157/1.22 |
| 3,160,196 | 12/1964 | Ohlsen et al. | 157/1.17 |
| 3,211,206 | 10/1965 | Garthe | 157/1.24 |
| 3,267,977 | 8/1966 | Turpin . | |
| 3,717,192 | 2/1973 | Hoover et al. | 157/1.1 |
| 3,867,975 | 2/1975 | Johnson | 157/1.2 |
| 4,299,265 | 11/1981 | Alm | 157/15 X |
| 4,461,335 | 7/1984 | Beenmer | 157/1.22 |

*Primary Examiner*—D. S. Meislin
*Attorney, Agent, or Firm*—Renner, Kenner, Bobak, Greive, Taylor & Weber

[57] ABSTRACT

A center post tire changing apparatus for mounting or demounting a tire from a wheel includes an elongated support post having a wheel support assembly disposed on one end of the support post and a center post connected to and extending upwardly from the wheel support assembly and in coaxial alignment with the support post. A wheel securing assembly is disposed upon the center post, wherein the wheel is securely mounted on the center post between the wheel support assembly and the wheel securing assembly. A bead beaker is preferably permanently secured to the support post and is noted to be continuously adjustable thereon.

15 Claims, 14 Drawing Sheets

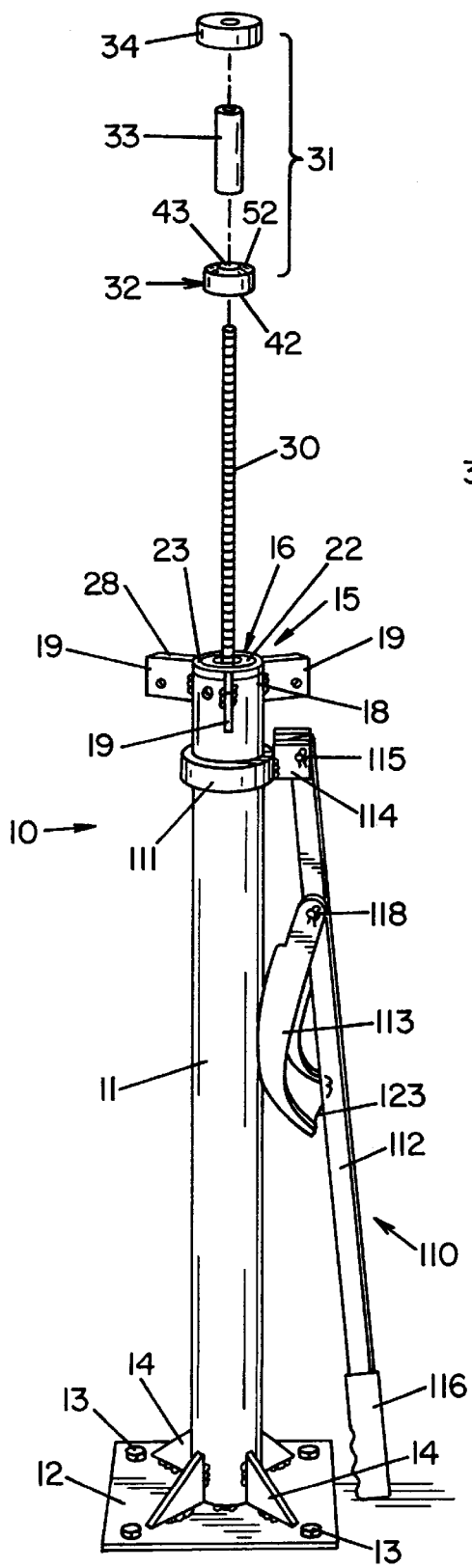
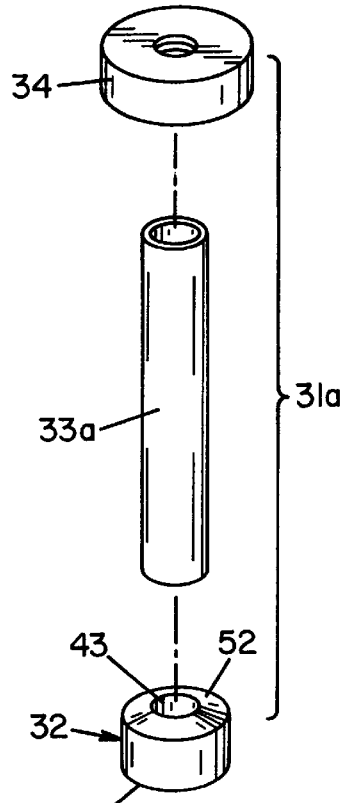
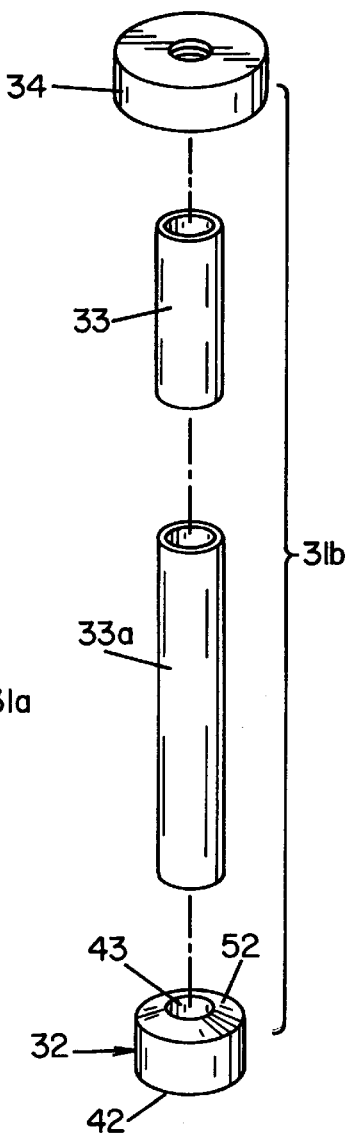
FIG. 1A
FIG. 1B
FIG. 1C

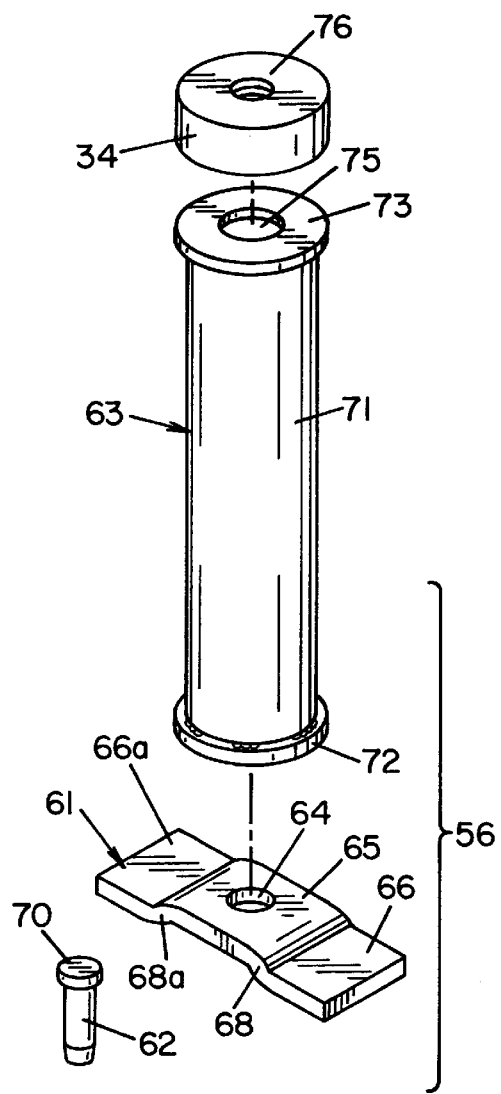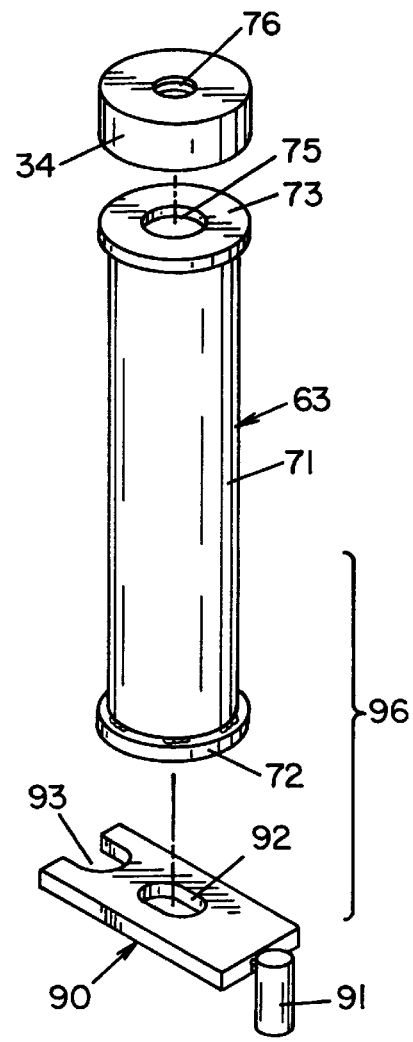
FIG. 4B
FIG. 6B

CENTER POST TIRE CHANGING APPARATUS

TECHNICAL FIELD

The present invention relates generally to an apparatus designed for breaking the bead of a tire and, separately, for effectively holding a tire in place while mounting and/or demounting the tire from a wheel rim. More particularly, the present invention relates to an apparatus of the type having a center post over which the tire may be positioned on the apparatus prior to mounting and/or demounting the same. Specifically, the present invention relates to a manually operated, center post tire changing apparatus capable of accommodating a range of tire sizes and practically all types of wheel rims.

BACKGROUND OF THE INVENTION

Modern tire changing equipment today ranges from a variety of simple, manually-operated systems to complex, automated, pneumatically-driven systems. The extremely high cost and technical skill required to operate the equipment makes many of the automated systems prohibitive for certain users, particularly low volume users or those dealing with specialty tires. Manually-operated equipment, therefore, is still pervasive throughout the tire changing equipment market, providing affordable tools that can be adapted to a variety of work environments. Unfortunately, many tire changing apparatus, both automated and manually-operated, are not particularly suited for use with a wide range of tire sizes and/or wheel rim types.

There are essentially two types of manually-operated tire mounting and demounting apparatus in use today. One type of tire changer employs a rim clamping device or system to securely hold the rim stationary while mounting or demounting the tire. For example, Thostenson U.S. Pat. No. 2,873,777 discloses a center post tire changing apparatus with a wheel mount comprising radial arms which grip and clamp a rim circumferentially. The radial clamps extend and retract to accommodate rims of different, but limited, diameter. U.S. Pat. Nos. 2,534,515, 2,888,064, and 1,538,875 disclose similar rim clamping devices. Disadvantageously, however, all of these rim clamping devices or apparatus require significant clamping force be applied to the wheel rims in order to secure the wheel to the apparatus and prevent rotation of the wheel during the mounting or demounting operations. Oftentimes, the amount of clamping force may be excessive, thereby causing wheel deformation or damage to the rim of the wheel, particularly where small, lighter (e.g., aluminum) wheels are employed.

Accordingly, in order to prevent rim deformation, the other common type of tire changing apparatus is often employed. This type of manually-operated tire changing apparatus includes a center post over which the wheel in placed, and an adapter, spacer or other clamping device or assembly is then threaded or otherwise secured to the center post and secures the wheel near its center. In order to prevent rotation, the other side of the wheel may be pinned against a plate near its center or may rest on its rim. However, placement of the tire on the rim, like the rim clamping devices, often leads to damaged or deformed rims. Moreover, use of a plate might also deform or damage the wheel near its center.

Consequently, in order to avoid the potential for wheel deformation, a pin blocking mechanism has been developed in the prior art. Generally, such a mechanism includes additional parts such as bolts that may be placed through the lug holes of the wheel and through corresponding holes in the plates or adapters located on the apparatus in order to securely hold the wheel in place. For example, Johnson U.S. Pat. No. 3,867,975 teaches a floor-mounted, center-post tire changing tool with a threaded center bar for use on small wheels in the 4 to 12-inch diameter range. The wheel is secured from rotation on the tire changer by inserting bolts through the wheel's lugholes matched to holes on a plate concentric with the post. U.S. Pat. Nos. 3,065,449 and 3,717,192 also disclose various pin blocking mechanisms. Further, Beemer U.S. Pat. No. 4,461,335 teaches a center post tire changer with a baseplate through which a pin can be inserted to prevent wheel rotation. The pin block works in conjunction with a curved rim engaging flange which exerts axial force on the wheel center hole to center the wheel and prevent rotation. Foster U.S. Pat. No. 3,056,449 similarly discloses a conical flange to exert axial force on the wheel center hole.

While the use of pin blocking mechanisms avoids the potential for wheel deformation inherent with rim clamping and the like, there are clear disadvantages to using an apparatus limited to only this means of wheel rotation prevention. In some instances, certain prior art center-post tire changing apparatus are limited for use on wheels having only a particular lug pattern. In other words, the range of wheel types and sizes that can be mounted may be limited due to a mismatch between the lug pattern of the wheel and the pin holes on the tire changer. However, at least one patent, Garthe U.S. Pat. No. 3,211,206, has developed an adapter plate to accommodate various lug patterns on a center-post tire changer.

This patent notwithstanding, pin blocking systems are necessarily dependent upon the wheel having lugholes, thus limiting the types of wheels the tire changer can accept. Desirably, a manually-operated tire mounting and demounting apparatus should have the capability of mounting or demounting tires from all types of wheels, including straight wheels (i.e., wheels having a single centering hole for the axle and no lugholes), bearing wheels (i.e., wheels similar to straight wheels but having an inner bearing race located in the centering hole), lug wheels (i.e., wheels having a center hole and lugholes as commonly found on automobiles), and ATV wheels (i.e., wheels, with or without lugholes, having a deep center or high rims extending well above the center portion of the wheel, also known as deep dish-type wheels). To date, the art has not provided a center-post tire changing apparatus that can be used to change tires on all of these types of wheels. The need, therefore, exists for a center-post tire changer that can be used to change tires on all types of wheels.

Once the wheel is securely mounted on the center-post tire changing apparatus, a tire iron or similar device may be used to pry the bead of the tire over the rim. The tire iron or a similar device may also be used for remounting the tire over the wheel rim. The advantage of the center post tire changing apparatus is that the tire mounting and demounting actions often utilize the center post as a fulcrum to apply the necessary force to the tire iron to lift the bead of the tire over the wheel rim.

In order to change a tire, it is first necessary to detach or "break" the bead of the tire away from the rim at the periphery of the wheel. In some cases this can be very difficult and, oftentimes, a device known as a bead breaker is required to aid in the performance of this task. Since breaking the bead is often a part of changing a tire, it is believed desirable to include a bead breaker with the tire mounting or demounting apparatus. Such bead breakers are desirably either permanently or temporarily attached to the tire changing apparatus.

The prior art has developed several types of bead breakers, some of which are lever actuated. Common to these is a bead-engaging foot pivot-mounted medially between the lever arm ends. Less common, but also known, is one end of the lever arm mounted adjustably with respect to the horizontal distance from the lever mount to the radial plane of the tire mounted for bead breaking. These features generally allow for accommodation of a range of tire diameters and widths in the bead breaker. However, the prior art disclosures vary in the means of mounting the lever and the location of the lever mount relative to the tire mounted for tire removal. These variations directly impact the operational complexity of the bead breakers.

Larson U.S. Pat. No. 2,602,494 teaches a lever actuated bead breaker mounted horizontally above the tire. The lever arm is pin-mounted to a side post, with the horizontal position of the lever mount adjustable by changing the pin position in any of several holes disposed along the axis of the post. This configuration requires the user to manually adjust pin position and to release the tire from a mounting bracket and then turn over the tire to break the other bead. Hence, the tire must necessarily be resecured in a mounting bracket twice during the beak breaking process.

Thostenson U.S. Pat. No. 2,873,777 teaches a center-post tire changer with lever actuated bead breakers mounted on the post. A lever arm extension is interchangeable in removable slide-mounted brackets above and below the tire mount on the tire changing apparatus. The horizontal positions of the lever mounts above and below the tire are continuously adjustable by sliding the mounts along the post axis. Thus the tire is mounted only once for bead breaking but remounting of the lever arm extension is required for each bead breaking. Moreover, it is well known that it is sometimes very difficult to break a bead of a tire from a wheel rim from below the tire.

Beemer U.S. Pat. No. 4,461,335 teaches a center-post tire changer with a lever-actuated bead breaker slide-mounted on the post above the tire mount. The tire must be mounted twice during bead breaking. The lever arm also serves as the tire iron so the bead breaker must be disassembled before tire dismounting and mounting and reassembled for the next tire.

The prior art thus discloses in various forms adjustable bead breakers that accommodate a range of tire widths and diameters. The prior art does not, however, disclose a continuously adjustable bead breaker permanently mounted on a center post tire changer that allows for breaking both beads of a tire without remounting the tire on a bracket before breaking the second bead. A need exists, therefore, for a center post tire changer with such a bead breaker.

SUMMARY OF INVENTION

It is, therefore, an object of the present invention to provide a center post tire changing apparatus for mounting and demounting a tire from a wheel rim.

It is another object of the present invention to provide a center post tire changing apparatus, as above, which is capable of mounting and demounting all four major types of wheels, i.e., straight wheels, bearing wheels, lug wheels, and ATV wheels.

It is still another object of the present invention to provide a center post tire changing apparatus, as above, which is capable of mounting and demounting a wide range of tire sizes.

It is yet another object of the present invention to provide a center post tire changing apparatus, as above, wherein the wheel rims will not be deformed or damaged.

It is still another object of the present invention to provide a center post tire changing apparatus, as above, wherein the bearings used in bearing wheels are protected during tire changing.

It is yet another object of the present invention to provide a center post tire changing apparatus, as above, which is not dependent upon a particular lug pattern for mounting or demounting lug wheels.

It is still another object of the present invention to provide a center post tire changing apparatus, as above, that can be used as a stand alone, floor or bench-mounted device or as an accessory to a rim-clamp machine.

It is a further object of the present invention to provide a center post tire changing apparatus having a continuously adjustable bead breaker permanently mounted on the support post for breaking the bead of a tire away from the wheel rim.

It is yet a further object of the present invention to provide a center post tire changing apparatus, as above, capable of breaking the bead of the tire away from the wheel rim without use of tire brackets for holding the tire and without having to remount the tire into position on a center post in order to break the bead on the other side of the tire.

It is still a further object of the present invention to provide a center post tire changing apparatus, as above, wherein the bead breaker is permanently mounted on the support post below the center post such that the bead of the tire is broken away from the wheel rim prior to being positioned on the center post and the rest of the tire changing mechanisms are located and operatively engaged upon positioning the tire on the center post of the tire changing apparatus.

At least one of the foregoing objects, together with the advantages thereof over the known art relating to center post tire changers, which shall become apparent from the specification that follows, are accomplished by the invention and improvements hereinafter described and claimed.

In general, the present invention provides a center post tire changing apparatus for mounting or demounting a tire from a wheel, the apparatus comprising an elongated support post having a wheel support assembly disposed on one end of the support post; a center post connected to and extending upwardly from the wheel support assembly and in coaxial alignment with the support post; a wheel securing assembly disposed upon the center post, wherein the wheel is securely mounted on the center post between the wheel support assembly and the wheel securing assembly; and a bead beaker permanently secured to the support post and being continuously adjustable thereon.

Further, the present invention provides a center post tire changing apparatus for mounting or demounting a tire from a bearing wheel having bearing races within the axle thereof, the apparatus comprising a elongated support post having a wheel support assembly disposed on one end of the support post, a center post connected to and extending upwardly from the wheel support assembly and in coaxial alignment with the support post, and a wheel securing assembly disposed upon the center post, wherein the wheel is securely mounted on the center post between the wheel support assembly and the wheel securing assembly, wherein the wheel support assembly includes a lower bearing guide having a first recessed surface area proximate to the center post and the wheel and the wheel securing assembly includes an upper bearing guide having a second recessed surface area proximate to the center post and the wheel; and wherein the bearing races of the wheel are received within the recessed surface areas and do not contact any surface of the lower bearing guide or the upper bearing guide.

Other aspects of the present invention are found in a bead breaking device comprising a post, and a bead breaker continuously adjustable and permanently mounted on the post, the bead breaker including a ring slidably engaging the post, an elongated lever bar pivotably connected to the ring at one end, and a foot disposed medially on the lever bar.

Preferred exemplary embodiments of a center post tire changing apparatus incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1A is perspective view of a center post tire changing apparatus according to the concepts of the present invention, further including various elements comprising one embodiment of a wheel securing assembly.

FIG. 1B is an enlarged, exploded view of the wheel securing assembly depicted in FIG. 1A and suitable for securely mounting a bearing wheel to the center post tire changing apparatus of FIG. 1A.

FIG. 1C is an enlarged, exploded view of an alternative embodiment of the wheel securing assembly of FIG. 1B.

FIG. 4B is an enlarged exploded view of one embodiment of a wheel securing assembly suitable for securely mounting an ATV wheel to the center post tire changing apparatus.

FIG. 6B is an enlarged, exploded view of one embodiment of a wheel securing assembly suitable for securely mounting a five-hole lug wheel to the center post tire changing apparatus.

PREFERRED EMBODIMENT FOR CARRYING OUT THE INVENTION

Figure 2:
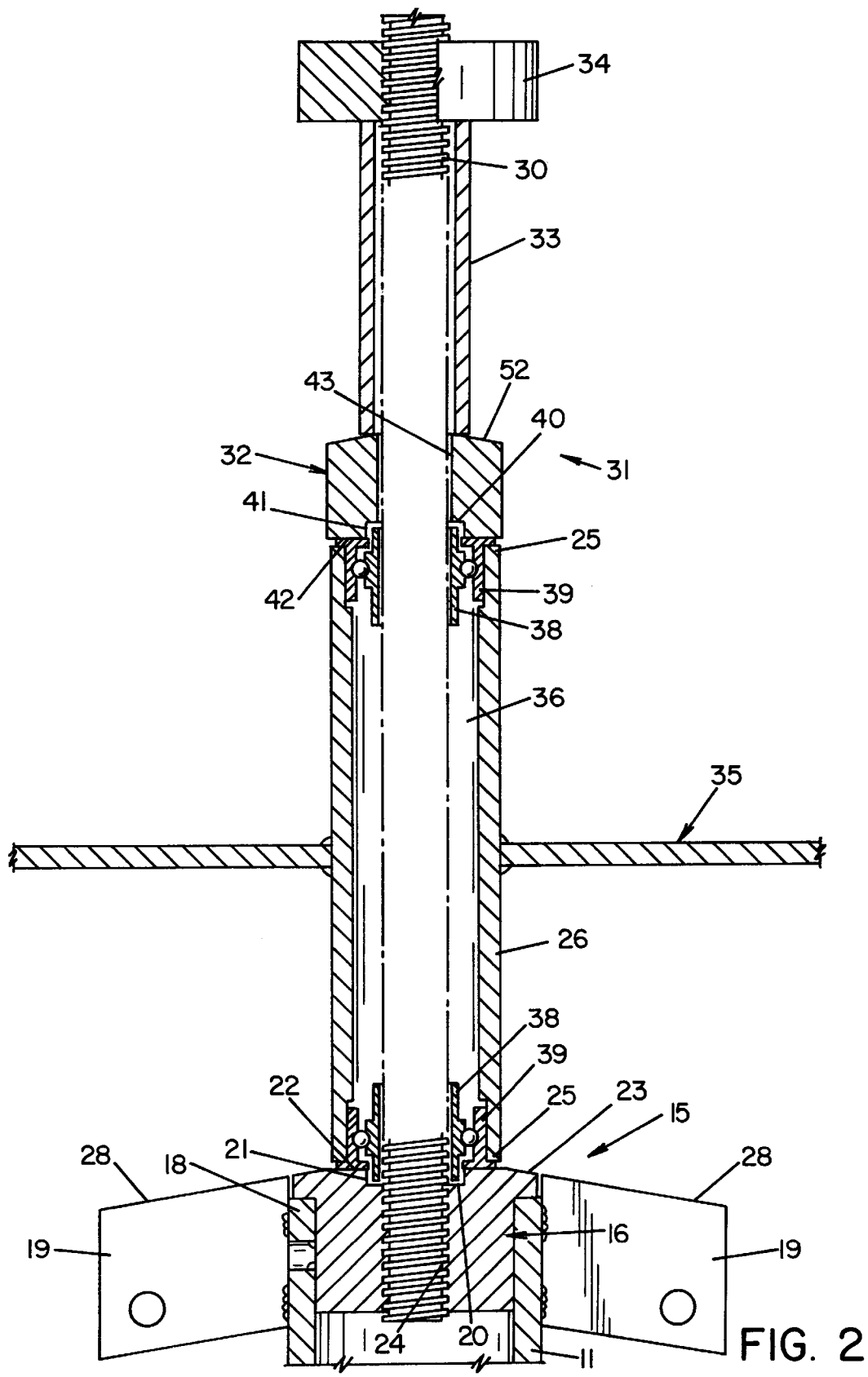
FIG. 2 is a partial, cross-sectional view of the upper portion of the center post tire changing apparatus of FIG. 1A having a bearing wheel securely mounted thereto.

One representative embodiment of a center post tire changing apparatus made in accordance with the concepts of the present invention is indicated generally by the numeral 10 in FIG. 1A of the accompanying drawings. The tire changing apparatus 10 may include a support post 11 and a base plate 12 mounted to the lower end thereof. The base plate 12 is preferably secured to a floor or other surface suitable for providing stability to the apparatus 10 by any means known in the art such as by bolts 13. The support post 11 is preferably a hollow cylinder fabricated from steel pipe or other suitable material sufficient to carry out the requirements of the present invention. In particular, the support post 11 should be sturdy and rigid enough to support the operation of a bead breaker as described hereinbelow and the weight of a wheel and a tire, as well as the torque associated with mounting and demounting the tire from the wheel. For embodiments with relatively long support posts potentially requiring additional strength, a plurality of support braces 14 extending between the support post 11 and base plate 12 may be employed.

As more particularly shown in FIG. 2, a wheel support assembly, generally indicated by the numeral 15, is preferably disposed at the upper end of the support post 11. The wheel support assembly 15 includes a lower bearing guide 16 disposed within the end 18 of the support post 11 and a plurality of fins 19 extending radially from the preferably cylindrical support post 11. It will be appreciated that the wheel support assembly 15 may be configured in any manner known in the art so long as it meets the requirements of the subject invention. In a preferred embodiment, an exposed surface area of the lower bearing guide 16 includes a bearing saver surface 20, a vertical wall 21, a contact surface 22, and a beveled edge surface 23. The bearing saver surface 20 is the recessed surface defining a central aperture 24 within the lower bearing guide 16 and is preferably essentially transverse to the central aperture 24. The vertical wall 21 preferably defines the radially outer limit of the bearing saver surface 20 and extends upwardly in preferably coaxial alignment with central aperture 24. The contact surface 22 defines the upward limit of the vertical wall 21 and extends radially outwardly in a preferably concentric relationship with the bearing saver surface 20 until it becomes the beveled edge surface 23. As defined, the contact surface 22 is the essentially flat surface that will come into contact with an end 25 of an axle 26 of a bearing wheel or a straight wheel that is securely mounted onto the tire changing apparatus 10. This contact surface 22 forms the upmost end of the support post 11. The bevel edge surface 23 preferably extends radially from the contact surface 22, but is preferably slanted slightly downward so as to be coextensive and coplanar with the top surface 28 of fins 19.

It will be appreciated that the fins 19 may be coextensive with the contact surface 22, i.e., have a flat top surface, such that the beveled edge surface is of no importance. However, the fins 19 and beveled edge surface 23 are preferably each slanted as more particularly shown in FIGS. 4A, 5A, and 6A in order to establish the center of the wheel and to prevent the wheel from sliding in any one direction upon the application of torque associated with the mounting or demounting of the tire from the wheel having a relatively large center hole.

A center post 30 is preferably a threaded rod which is securely positioned within the central aperture 24 of the lower bearing guide 16 such that the center post 30 extends essentially axially upward from the top end 18 of the support post 11 for a distance sufficient to accommodate any type of wheel, including but not limited to bearing wheels, straight wheels, lug wheels, and all-terrain vehicle (ATV) wheels, as set forth hereinbelow. The center post 30 is preferably threaded into the central aperture 24 as shown in FIG. 2 in order to facilitate removal and replacement of the center post 30 upon damage, but could be welded or otherwise secured within the support post 11 by any other means known in the art.

Upon placement of a wheel (with or without a tire) over the center post 30 as described in greater detail hereinbelow, a wheel securing assembly such as 31 may be used to securely hold or otherwise mount the wheel (not shown in FIG. 1A) on the tire changing apparatus 10. It will be appreciated that, depending on the type and size of wheel to be mounted, any of several wheel securing assemblies are used to securely mount the wheel on the center post tire changing apparatus 10. For example, in FIG. 1A, an upper bearing guide 32, a short spacer sleeve 33, and a hold down nut 34 comprise the wheel securing assembly 31. These parts are shown to illustrate the orientation of the wheel securing assembly 31 used to securely mount a bearing wheel to the tire changing apparatus 10 as set forth hereinbelow.

With reference to FIG. 2, part of a bearing wheel 35 is shown securely mounted on the center post 30 between the wheel support assembly 15 and the wheel securing assembly 31 of the tire changing apparatus 10. More particularly, a center hole 36 defined by the hollow axle 26 of the bearing wheel 35 receives the center post 30 such that center post 30 projects substantially through the center hole 36. As is well known in the art, bearing wheels such as wheel 35 include bearing races 38 disposed at the ends 25 of the axle 26. These races 38 may be secured within the axle 26 by any means known in the art such as by braces 39 permanently attached to the ends 25 of the axle 26. In prior tire changing apparatus, the bearing race 38, as the outermost part of the bearing wheel 35, would necessarily contact the mounting surface of the tire changing apparatus, thereby allowing for the potential of deforming or damaging the bearing race. However, in the present invention, it can be seen that the bearing race 38 does not come into contact with any surface, the bearing race 38 falling within the recessed area defined by the exposed surface area of the wheel support assembly 15 on the lower end of the axle 26 and, at the upper end of the axle, falling within a similarly recessed area defined by the exposed surface area of the upper bearing guide 32.

More particularly, the exposed surface area of the upper bearing guide 32 includes a bearing saver surface 40, a vertical wall 41, and a contact surface 42. The bearing saver surface 40 is the recessed surface defining a central aperture 43 within the upper bearing guide 32 and is preferably essentially transverse to the central aperture 43. The vertical wall 41 preferably defines the radially outer limit of the bearing saver surface 40 and extends downwardly in preferably coaxial alignment with central aperture 43. The contact surface 42 defines the downward limit of the vertical wall 41 and extends radially outwardly in a preferably concentric relationship with the bearing saver surface 40. As thus defined, the contact surface 42 is the essentially flat surface that comes into contact with the brace 39 or end 25 of the axle 26 of a bearing wheel or a straight wheel when the wheel is securely mounted onto the tire changing apparatus 10. Hence, it will be appreciated that the bearing wheel 35 is supported by the braces 39 at the ends 25 of the axle 26 wherein the brace 39 located on one end of the axle 26 rests on the contact surface 22 of the wheel support assembly 15 and, on the other end of the axle 26, the contact surface 42 of the upper bearing guide 32 rests on the brace 39.

As depicted in FIG. 2, a short spacer sleeve 33 may be disposed over a further length of the center post, and the entire ensemble may be securely held in place by the hold down nut 34. The hold down nut 34 is preferably round and is threaded for securely fastening the wheel securing assembly 31 to the center post 30. The nut should be tightened enough to prevent the bearing wheel 35 from rotating or sliding during the tire changing process. Thus, while significant force needs to be applied to the axle 26 between the wheel support assembly 15 and the wheel securing assembly 31 in to the prevent the rotation or slippage of the bearing wheel 35, the bearing race is not engaged and therefor is not potentially damaged.

It will be appreciated that several alternative embodiments of the wheel securing assembly 31 for use with bearing wheels exist. As shown in FIGS. 1B and 1C, the wheel securing assemblies 31a and 31b may include the same upper bearing guide 32 and hold down nut 34 as discussed hereinabove. However, depending upon the length of center post that is still projecting above the axle 26 of the bearing wheel 35, a long spacer sleeve 33a (see FIG. 1B) may replace the short spacer sleeve depicted in FIGS. 1A and 2, and if even more length is available, both the short and long spacer sleeves 33, 33a may be employed. The spacer sleeves 33, 33a are preferably used to protect the threads of the center post during the mounting and demounting operation as will be detailed hereinbelow.

Figure 3A:
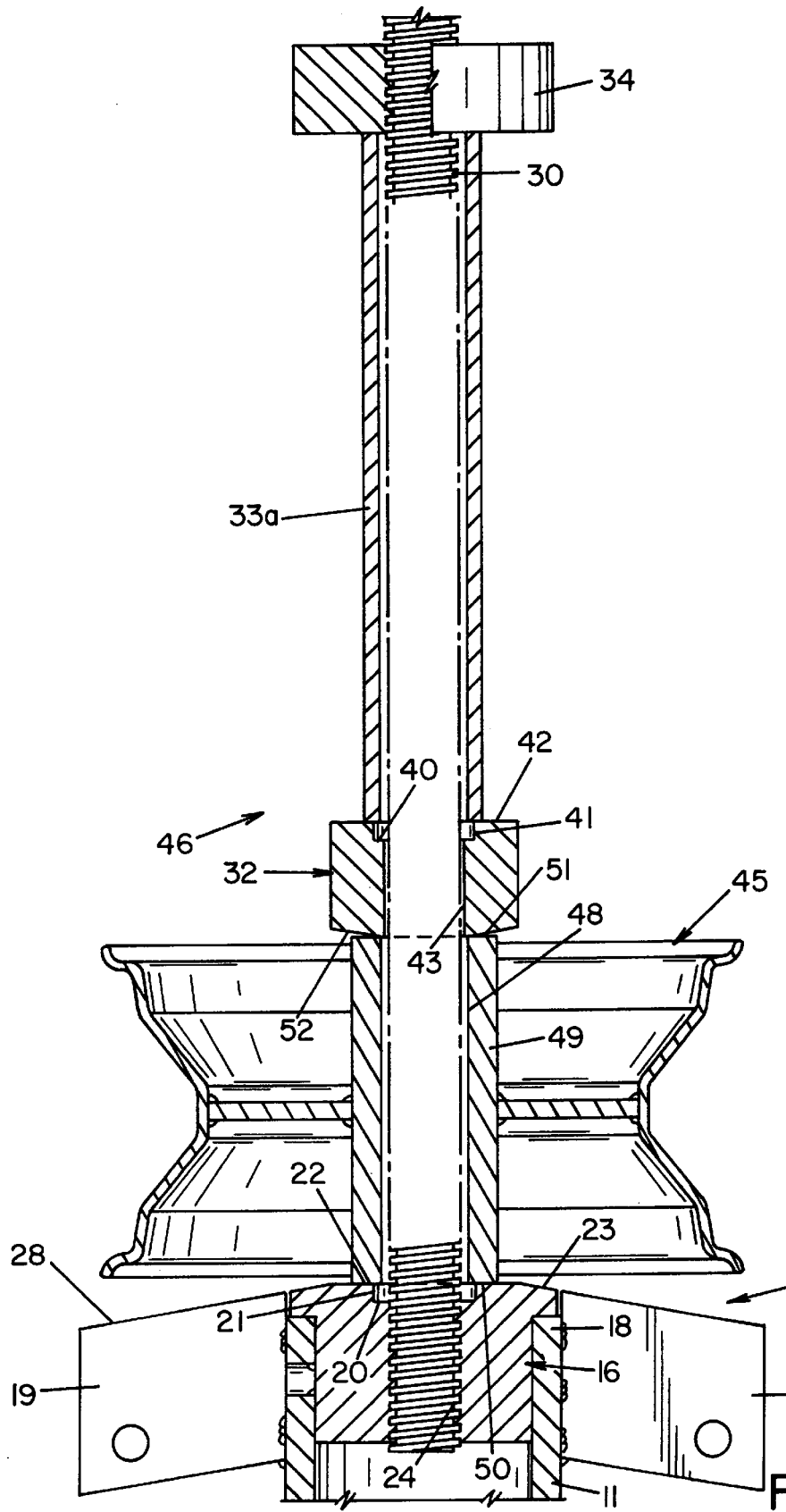
FIG. 3A is a partial, cross-sectional view of the upper portion of a center post tire changing apparatus according to the concepts of the present invention having a straight wheel securely mounted thereto.

With reference to FIG. 3A, a straight wheel 45 is shown securely mounted on the center post 30 between the wheel support assembly 15 located on the end 18 of the support post 11 as described hereinabove and a differently configured wheel securing assembly, indicated generally by the numeral 46 in FIG. 3B, of the tire changing apparatus 10. More particularly, a center hole 48 defined by a hollow axle 49 of the straight wheel 45 receives the center post 30 such that center post 30 projects through the center hole 48. The one end 50 of the axle 49 of the wheel 45 rests on the contact surface 22 of the lower bearing guide 16 in a manner similar to the axle 26 of the bearing wheel 35 in FIG. 2. However, on straight wheels, there is no bearing race to protect.

At the other end 51 of the axle 49, the wheel securing assembly 46 securely mounts and otherwise holds the straight wheel 45 in place on the tire changing apparatus 10. As shown in FIGS. 3A and 3B, the wheel securing assembly includes the same upper bearing guide 32, long spacer sleeve 33a, and hold down round nut 34 as shown and discussed earlier. However, upper bearing guide 32 is turned over such that a beveled surface 52 of the upper bearing guide 32 contacts and rests in the end 51 of axle 49 of straight wheel 45. The beveled surface 52 presents a slightly outward force on the end 51 of axle 49 such that as the upper bearing guide in forced downward, the straight wheel 45 is prevented from sliding or otherwise moving from its centered position on the center post 30 of the tire changing apparatus 10. As shown, spacer sleeve 33a then rests on the flat contact surface 42 and the recessed area of the upper bearing guide 32, like the lower bearing guide 16, is not required. Hold down nut 34 may then be preferably threaded onto the center post 30 to securely hold the straight wheel 45 onto the tire changing apparatus 10. Again, the nut 34 should be tightened enough to prevent the straight wheel 45 from rotating or sliding during the tire changing process.

Figure 3B:
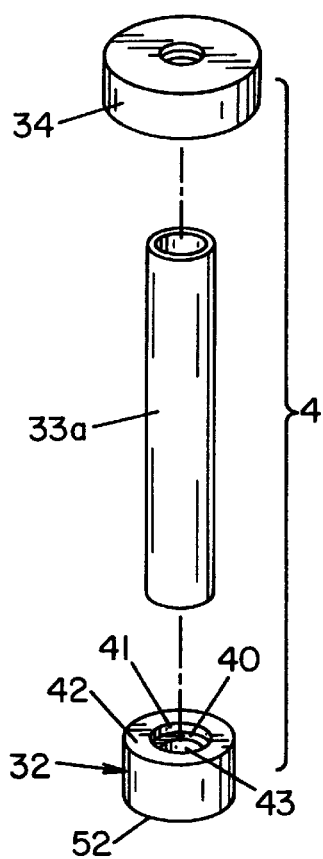
FIG. 3B is an enlarged, exploded view of one embodiment of a wheel securing assembly suitable for securely mounting a straight wheel to the center post tire changing apparatus.
Figure 3C:
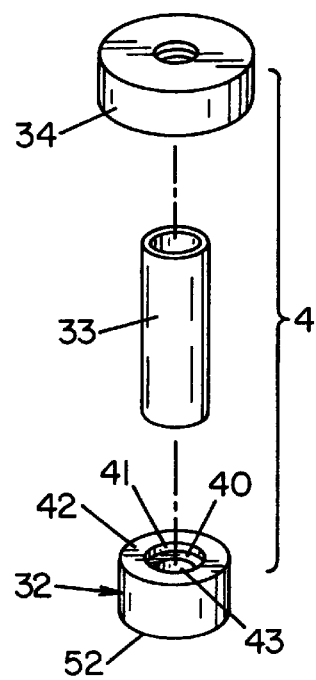
FIGS. 3C and 3D are enlarged, exploded views of alternative embodiments of the wheel securing assembly of FIG. 3B.
Figure 3D:
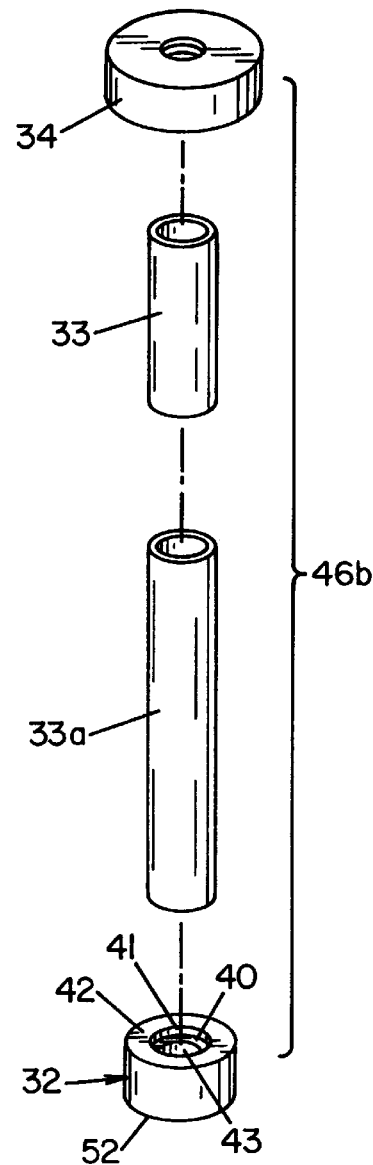

FIGS. 3B, 3C, and 3D include various alternative embodiments of the wheel securing assembly 46, 46a, 46b. For example, the wheel securing assemblies 46a and 46b may include the same upper bearing guide 32 and hold down nut 34 as discussed hereinabove. However, depending upon the length of center post that is still projecting above the axle 49 of the straight wheel 45, a short spacer sleeve 33 (see FIG. 3C) may replace the longer spacer sleeve depicted in FIGS. 3A and 3B, and if even more length is available, both the short and long spacer sleeves 33, 33a (see FIG. 3D) may be employed. Again, the spacer sleeves 33, 33a are preferably used to protect the threads of the center post during the mounting and demounting operation as will be detailed hereinbelow.

Figure 4A:
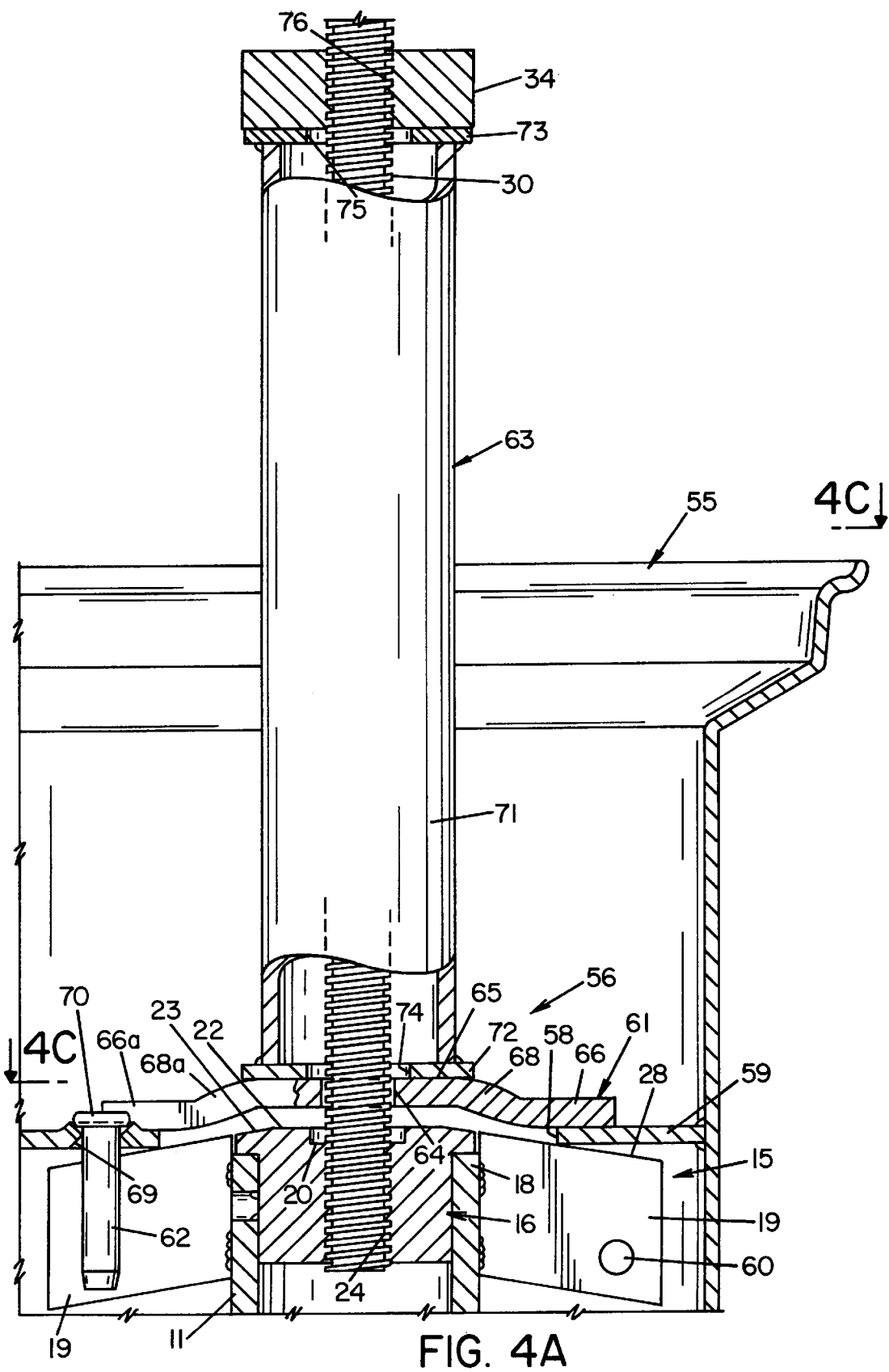
FIG. 4A is a partial, cross-sectional view of the upper portion of a center post tire changing apparatus according to the concepts of the present invention having an ATV wheel securely mounted thereto.

With reference to FIG. 4A, a portion of an all-terrain vehicle (ATV) wheel 55 is shown securely mounted on the center post 30 between the wheel support assembly 15 located on the end 18 of the support post 11 as described hereinabove and yet another configuration of a wheel securing assembly, indicated generally by the numeral 56 in FIG. 4B, of the tire changing apparatus 10. More particularly, a center hole 58 defined by a wheel plate 59 of the ATV wheel 55 is positioned over center post 30 such that wheel plate 59 rests on the fins 19 of the wheel support assembly 15. It will be appreciated that the center hole 58 of the ATV wheel 55 is much larger than the center holes 36 and 48 of the bearing wheel 35 or straight wheel 45, and therefore, the preferably slanted or sloped fins 19 may be used to align the ATV wheel 55 on the tire changing apparatus 10. If, by chance, a wheel has a center hole which is greater in diameter than the wheel support assembly 15, it will be appreciated that fin extensions (not shown) could be used to enlarge the diameter of the wheel support assembly 15. Such extensions could be fastened to the fins 19 by a bolt, a cotter pin or other fastening means at hole 60 in fins 19.

Once the ATV wheel 55 has been positioned and aligned on the fins 19 of the wheel support assembly 15, the ATV wheel 55 may be secured to the tire changing apparatus 10 using the wheel securing assembly 56 set forth in FIG. 4B. In particular, the wheel support assembly 56 includes a hold down plate 61, a pin 62, a post support barrel 63, and a hold down nut 34 like that earlier described hereinabove.

Figure 4C:
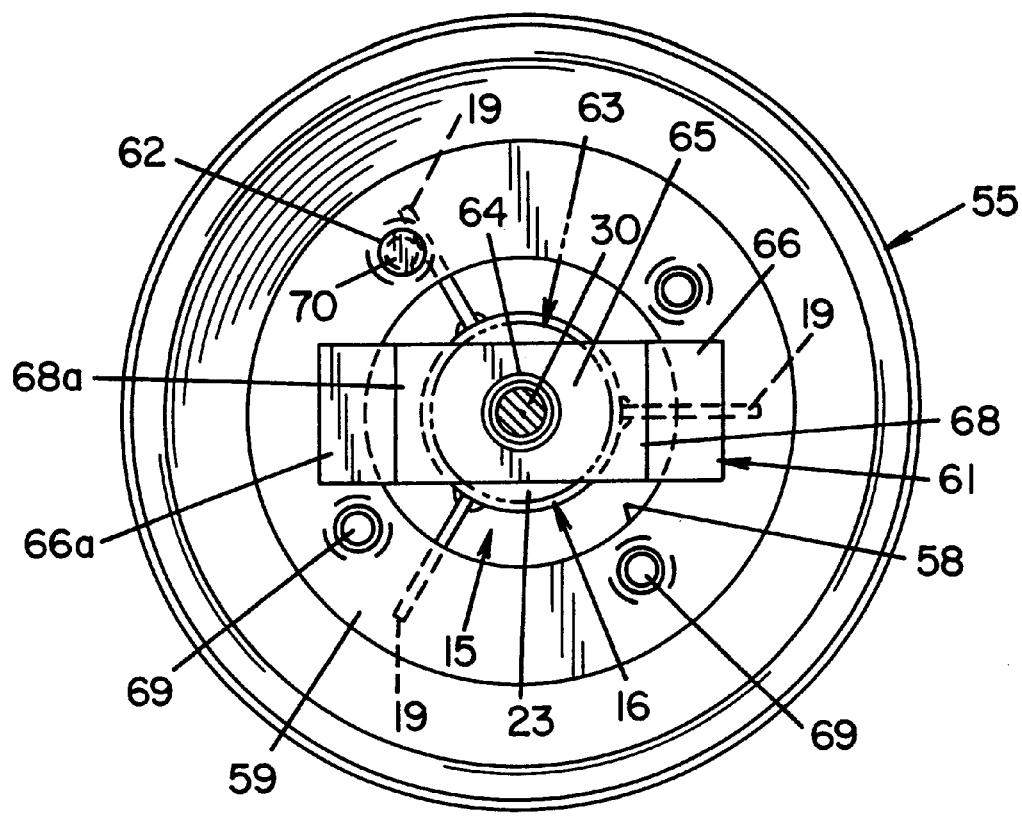
FIG. 4C is a sectional view of the ATV wheel mounted on the center post tire changing apparatus taken along the line 4C—4C in FIG. 4A.

With reference to FIGS. 4A and 4C, the hold down plate 61 is first positioned over the center post 30 through an aperture 64 located generally centrally of the hold down plate 61. The hold down plate 61 may be essentially of any configuration so long as it is long enough to extend across the diameter of the wheel plate 59 and rests on the upper side thereof. Preferably, the hold down plate 61 includes a planar region 65 proximate to the aperture 64, at least one planar region 66 distal to the aperture 64 and parallel to planar region 65, and at least one bend 68. In the preferred embodiment, hold down plate 61 is fabricated as a generally rectangular steel plate with two coplanar distal planar regions 66, 66a of substantially equal area on opposing ends of the rectangle, with each distal planar region 66, 66a offset from the proximate planar region 65 by two substantially similar bends 68, 68a. The bends 68, 68a aid in providing additional strength to the plate 61 and to raise the plate 61 above the uppermost surface, i.e., the contact surface 22, of the lower bearing guide 16, the proximate planar region 65 being presented away from the lower bearing guide 16. Thus, the distal planar regions 66, 66a which contact the wheel plate 59 are the only contact areas of the hold down plate 61.

Once the hold down plate 61 is positioned, the pin 62 may be inserted through one of the lugholes 69 found in the wheel plate. The pin 62 can be shaped in any manner known in the art but should preferably have a head 70 to prevent it from falling entirely through the lughole 69 and should be long enough so as to contact a side of a fin 19 beneath the wheel plate 59. Thus, once the pin 62 projects through lughole 69, the wheel 55 may be rotated slightly until the pin comes into contact with and rests against one of the fins 19 to prevent further wheel rotation during tire mounting and demounting.

The post support barrel 63 and hold down nut 34, respectively, may then be disposed on the center post 30. The post support barrel 63 rests on the proximate planar region 65, while the center post 30 projects through the post support barrel 63. The post support barrel 63 preferably includes a barrel body 71 and flanges 72 and 73 at each end thereof. In the preferred embodiment as shown in FIG. 4B, the post support barrel 63 is preferably fabricated from steel pipe and flanges 72 and 73 are fabricated from steel plates. Flanges 72 and 73 are preferably circular disks with axial holes 74 and 75, respectively, bored therethrough, for receiving the center post 30. It will be understood that the post support barrel 63 is larger in diameter than the prior spacer sleeves 33 since ATV wheels are larger and often require more force to mount and demount. The larger diameter barrel 63 provides a stronger support for the tire iron or like instrument in mounting or demounting a tire from the wheel.

The hold down nut 34 is essentially the same nut used in the prior wheel securing assemblies 31 and 46. The nut 34 includes a preferably threaded bore 76 disposed axially therethrough for securely fastening the entire wheel securing assembly 56 to the tire changing apparatus 10, thereby securely holding the wheel 55 in place on the tire changing apparatus 10. Thus, it will be understood that the wheel securing assembly 56 prevents both axial or radial rotation of the ATV wheel during tire mounting or demounting.

Figure 5A:
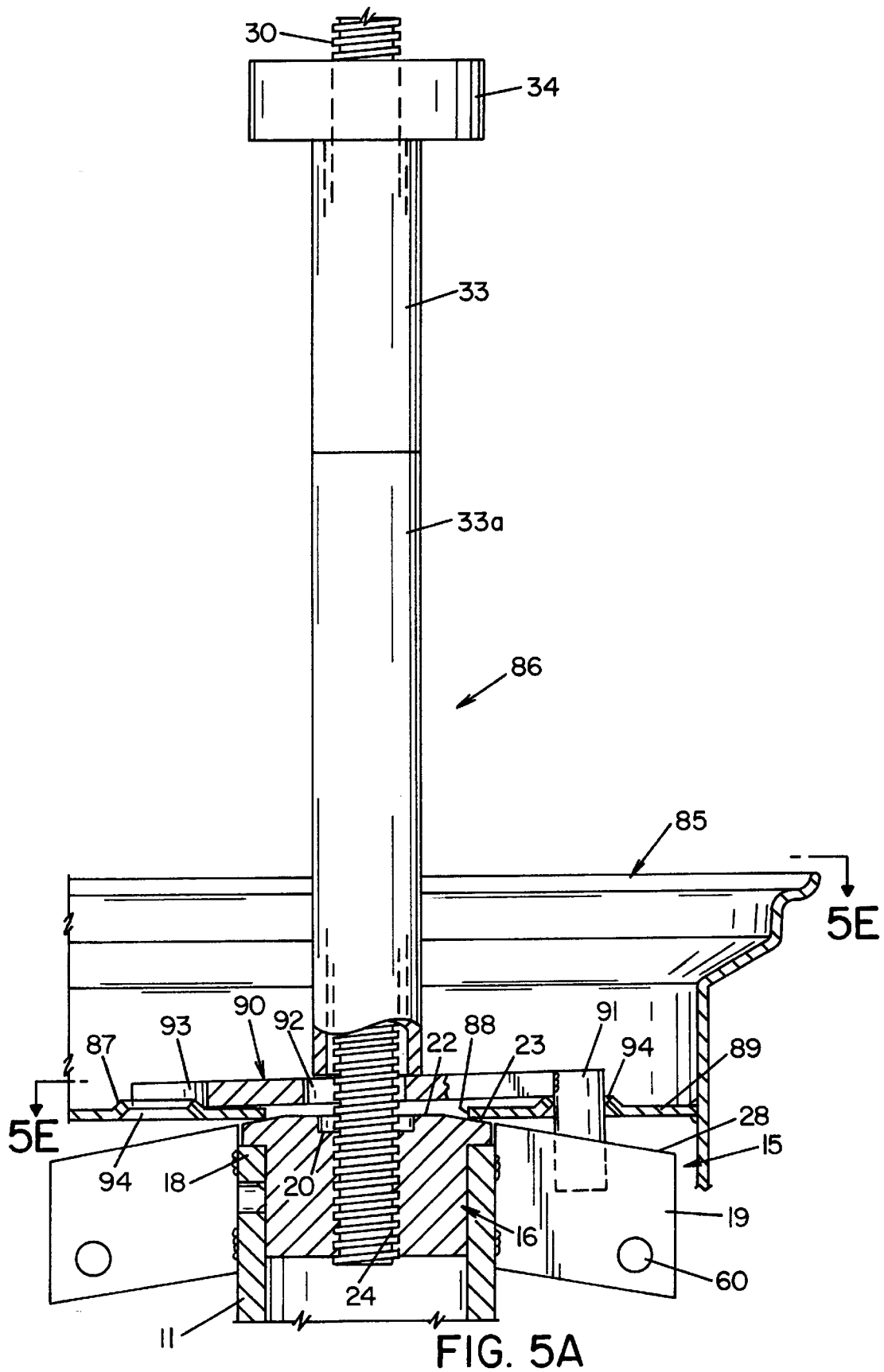
FIG. 5A is a partial, cross-sectional view of the upper portion of a center post tire changing apparatus according to the concepts of the present invention having a four-hole lug wheel securely mounted thereto.

With reference to FIG. 5A, a portion of a four-hole lug wheel 85 is shown securely mounted on the center post 30 between the wheel support assembly 15 located on the end 18 of the support post 11 as described hereinabove and yet another configuration of a wheel securing assembly, indicated generally by the numeral 86 in FIG. 5B, of the tire changing apparatus 10. More particularly, a center hole 88 defined by a wheel plate 89 of the four-hole lug wheel 85 is positioned over center post 30 such that wheel plate 89 rests on the fins 19 or, in this case, the beveled edge surface 23 of the lower bearing guide 16 of the wheel support assembly 15. It will be appreciated that, like the center hole 58 of the ATV wheel 55, the center hole 88 of the lug wheel is also much larger than the center holes 36 and 48 of the bearing wheel 35 or straight wheel 45, and therefore, the preferably slanted or sloped fins 19 or the beveled edge surface 23 may be used to align the lug wheel 85 on the tire changing apparatus 10. If, by chance, a lug wheel has a center hole which is greater in diameter than the wheel support assembly 15, it will be appreciated that fin extensions (not shown) could be used to enlarge the diameter of the wheel support assembly 15. Such extensions could be fastened to the fins 19 by a bolt, a cotter pin or other fastening means at holes 60 in fins 19.

Figure 5B:
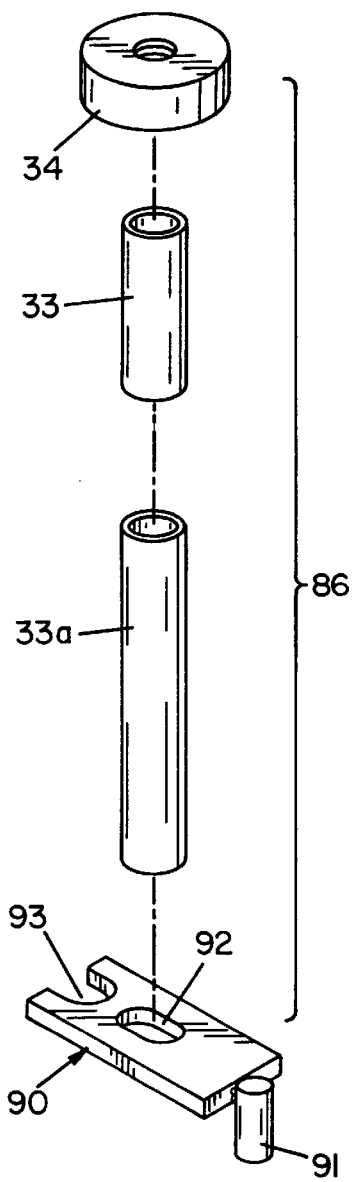
FIGS. 5B is an enlarged exploded view of one embodiment of a wheel securing assembly suitable for securely mounting a four-hole lug wheel to the center post tire changing apparatus.
Figure 5C:
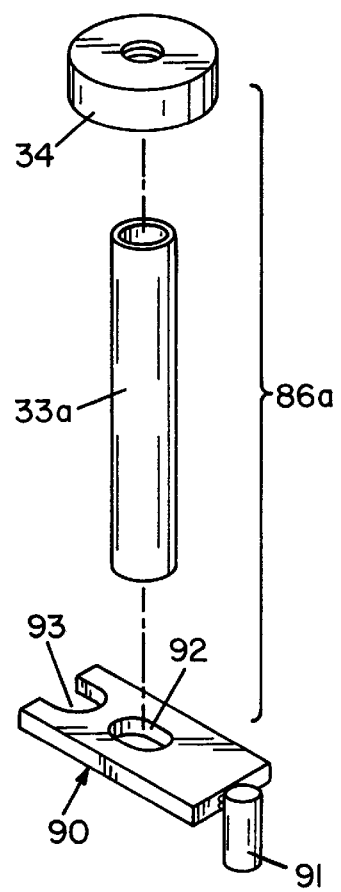
FIGS. 5C and 5D are enlarged, exploded views of alternative embodiments of the wheel securing assembly of FIG. 5B.
Figure 5D:
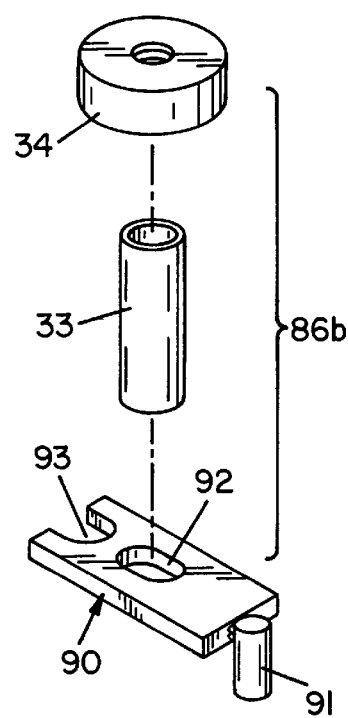

Once the lug wheel 85 has been positioned and aligned on the fins 19 or beveled edge surface 23 of the wheel support assembly 15, the wheel 85 may be secured to the tire changing apparatus 10 using any of a number of different wheel securing assemblies, including those depicted in FIGS. 5B, 5C, and 5D. In the preferred arrangement shown in FIGS. 5A and 5B, the wheel support assembly 86 includes a lug hold down plate 90, a long spacer sleeve 33a, a short spacer sleeve 33, and a hold down nut 34. The spacer sleeves 33, 33a and the hold down nut are essentially employed as described hereinabove. The lug hold down plate 90 differs somewhat from the hold down plate 61 earlier described to the extent that it includes a pin 91 welded or otherwise connected to lug hold down plate 90 at one end thereof. More particularly and with respect to the preferred embodiment, the plate 90 has a slightly elongated centralized aperture 92 and a semicircular recess 93 at the end opposite the pin 91. The elongated aperture 92 allows for the proper positioning of the pin 91 into a lughole such as 94 on wheel 85. While the use of the lug hold down plate 90 is limited to those wheels having lugholes located within a fixed range of distance from the center of the wheel, it is believed that most vehicular wheels having four or five lugholes are essentially the same distance or within the range of distance from the center of the wheel as permitted by the elongated aperture 92 of the lug hold down plate 90. Pin 91 is preferably a cylinder cut from steel rod and welded to the plate 90 and extends downward a sufficient distance to contact a side of a fin 19 beneath the wheel plate 89. Thus, once the pin 91 projects through lughole 94, the wheel 85 may be rotated slightly until the pin 91 comes into contact with and rests against one of the fins 19 to prevent further wheel rotation during tire mounting and demounting.

Unlike the prior hold down plate 61, the lug hold down plate 90 is preferably flat and rectangular and is cut from a steel plate. However, because the center hole 88 of the lug wheel 85 is smaller than that of the ATV wheel, the uppermost portion of the wheel support assembly 15 does not extend above or through the center hole 88, and the flat plate 90 does not contact the assembly 15.

Figure 5E:
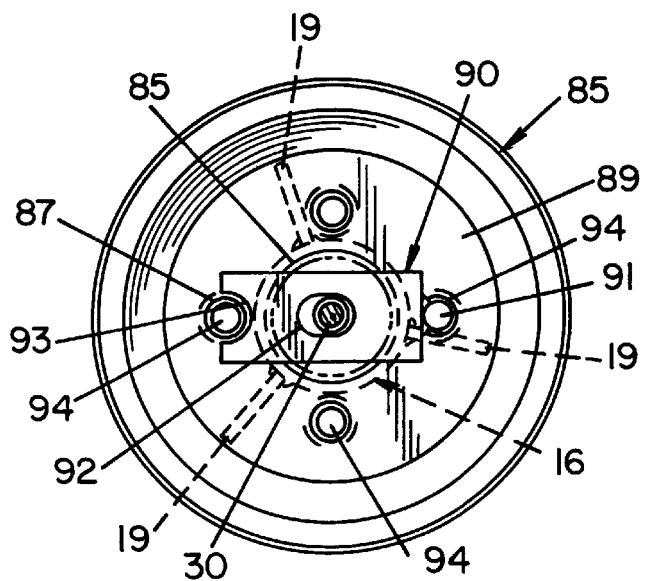
FIG. 5E is a sectional view of the four-hole lug wheel mounted on the center post tire changing apparatus taken along the line 5E—5E in FIG. 5A.

At the end of the plate 90 having the recess and as best shown in FIG. 5E, it will be appreciated that, in the four-lughole configuration of the wheel, there is a lughole 94 radially opposite the lughole 94 having the pin 91. Since the lugholes 94 on most vehicular lug wheels have a raised periphery 87 to them, the recess 93 may contact the periphery 87 so as to further serve to prevent the rotational movement of the plate 90 along with pin 91.

Alternative embodiments of the wheel securing assembly 86 are shown as 86a and 86b in FIGS. 5C and 5D, respectively. These embodiments include plate 90, sleeve 33, and hold down nut 34 as discussed hereinabove. However, depending upon the length of center post that is still projecting above the wheel 85, only a long spacer sleeve 33a (see FIG. 5C) may replace the combination of the long and short spacer sleeves 33a, 33 depicted in FIGS. 5A and 5B, and if even less length is available, only the short spacer sleeves 33 (see FIG. 5D) may be employed. Again, the spacer sleeves 33, 33a are preferably used to protect the threads of the center post during the mounting and demounting operation as will be detailed hereinbelow.

As a further alternative, the post support barrel 63 may be used as part of the wheel securing assembly 86. Such an embodiment would then include the lug hold down plate 90, the barrel 63, and the hold down nut 34. This embodiment is shown in FIG. 6B as wheel securing assembly 96.

Figure 6C:
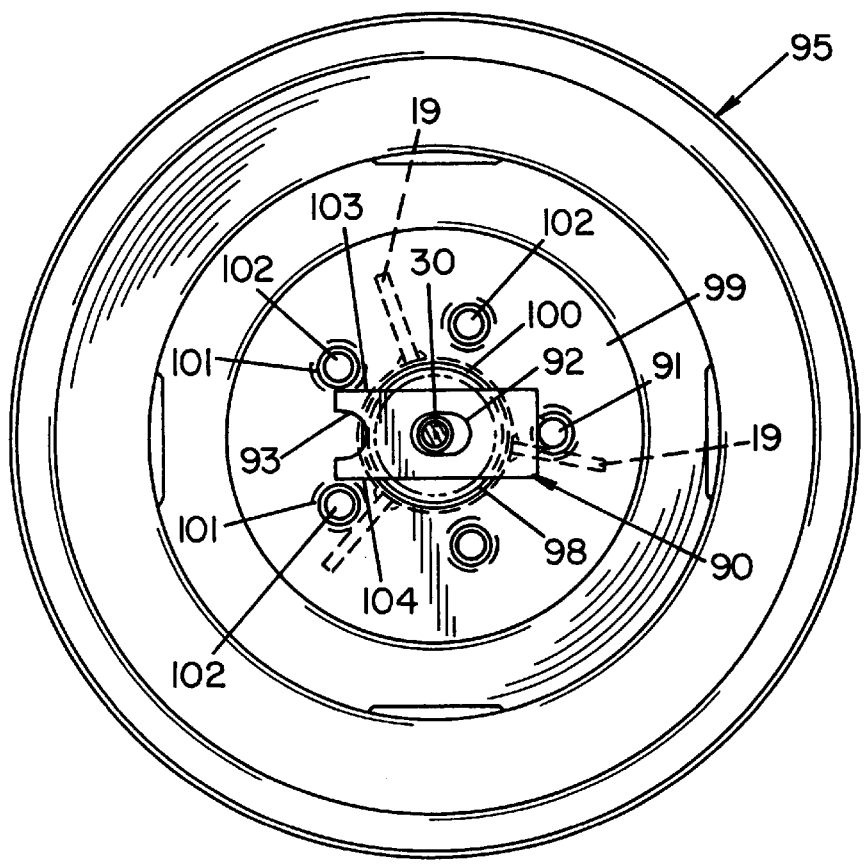
FIG. 6C is a sectional view of the five-hole lug wheel mounted on the center post tire changing apparatus taken along the line 6C—6C in FIG. 6A.
Figure 6A:
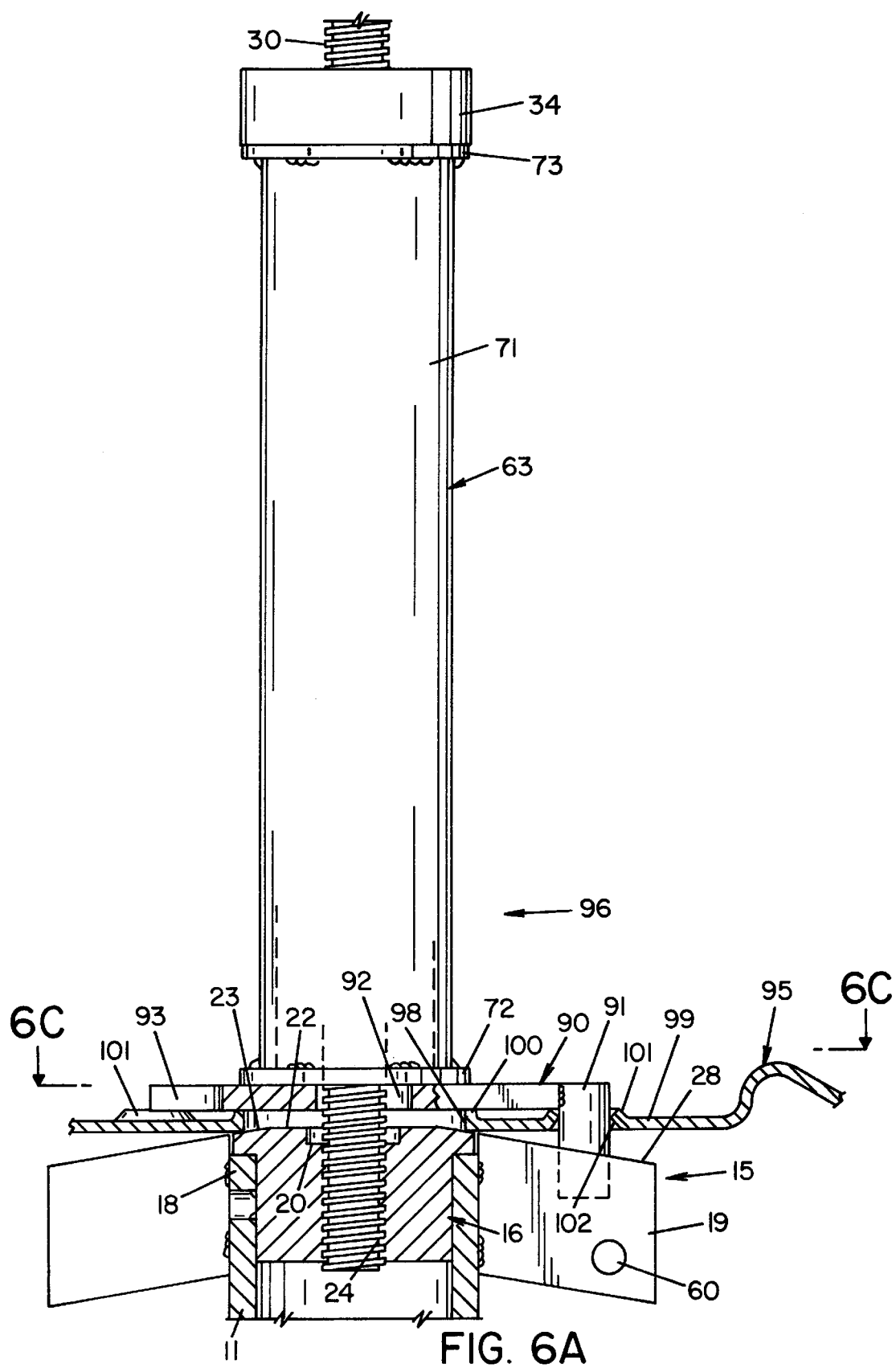
FIG. 6A is a partial, cross-sectional view of the upper portion of a center post tire changing apparatus according to the concepts of the present invention having a five-hole lug wheel securely mounted thereto.

With reference to FIG. 6A, a portion of a five-hole lug wheel 95 is shown securely mounted on the center post 30 between the wheel support assembly 15 located on the end 18 of the support post 11 as described hereinabove and the wheel securing assembly, indicated generally by the numeral 96 in FIG. 6B, of the tire changing apparatus 10. More particularly, a center hole 98 defined by a raised inner edge 100 of a wheel plate 99 of the five-hole lug wheel 95 is positioned over center post 30 such that wheel plate 99 rests on the fins 19 or, in this case, the beveled edge surface 23 of the lower bearing guide 16 of the wheel support assembly 15. It will be appreciated that, like the center hole 58 of the ATV wheel 55 and the center hole 88 of the four-hole lug wheel 85, the center hole 98 of the five-hole lug wheel 95 is also much larger than the center holes 36 and 48 of the bearing wheel 35 or straight wheel 45, respectively, and therefore, the preferably slanted or sloped fins 19 or the beveled edge surface 23 may be used to align the lug wheel 95 on the tire changing apparatus 10. If, by chance, a lug wheel has a center hole which is greater in diameter than the wheel support assembly 15, it will be appreciated that fin extensions (not shown) could be used to enlarge the diameter of the wheel support assembly 15. Such extensions could be fastened to the fins 19 by a bolt, a cotter pin or other fastening means at holes 60 in fins 19. Furthermore, if the wheel support assembly 15 extends through the center hole, the hold down plate 61 and pin 62 could be used alternatively to the lug hold down plate 90 as shown in FIGS. 6A and 6C. The same is also true for the four-hole lug wheel 85.

Once the five-hole lug wheel 95 has been positioned and aligned on the fins 19 or beveled edge surface 23 of the wheel support assembly 15, the wheel 95 may be secured to the tire changing apparatus 10 using any of a number of different wheel securing assemblies, including those depicted in FIGS. 4B, 5B, 5C, 5D and 6B. In the preferred arrangement shown in FIGS. 6A and 6B, the wheel support assembly 96 includes the lug hold down plate 90, the post support barrel 63, and the hold down nut 34. The post support barrel 63 and the hold down nut are oriented and positioned over the center post 30 in the same manner as described hereinabove. The lug hold down plate 90 is preferably structurally the same as described hereinabove, differing only in that the raised periphery 101 of the lugholes 102 are not disposed within the recess 93 of the plate 90.

Rather, the lug hold down plate 90 is of such a width at the recessed end that the elongated edges 103 and 104 of the plate 90 fit between two of the lugholes 102 of the five-hole lug wheel 95. Thus, as best shown in FIG. 6C, rotational movement of the plate 90, which also includes the slightly elongated centralized aperture 92 and pin 91, is further limited by edges 103 and 104 contacting tangentially the periphery 101 of the two lugholes 102 distal from pin 91.

Thus, it should now be evident that the tire changing apparatus 10 of the present invention can effectively accommodate all four major types of wheels, i.e., bearing wheels, straight wheels, ATV wheels, and lug wheels, without deforming or damaging the wheel rims or other important operational parts, e.g., bearing races.

However, prior to mounting a wheel on the tire changing apparatus as described hereinabove for demounting a tire from the wheel, it is generally necessary to break the bead of any existing tire from the wheel rim. In order to accomplish this task, a slidable, permanently mounted bead breaker, indicated generally by the numeral 110, is attached to the support post 11 of the tire changing apparatus 10.

With reference again to FIG. 1A, the bead breaker 110 of the present invention includes a slidable ring 111 concentric about the support post 11, an elongated lever bar 112 connected at one end to the ring 111, and a foot 113 connected medially to the lever bar 112. As more particularly seen in FIG. 7B, the ring 111 is preferably connected to one end of the lever bar 112 by a bracket 114. The lever bar 112 freely pivots at a pivot such as by clevis pin 115 disposed to connect the bracket 114 to the lever bar 112. The bracket 114 is preferably welded or otherwise permanently connected to the ring 111 such that the bead breaker preferably cannot be disengaged from the support post 11.

Returning to FIG. 1A, a handle grip 116 is preferably provided on the end of the lever bar 112 opposite the ring 111 to aid in the actuation of the lever bar 112. The foot 113 is connected to the lever bar 112 between the ends thereof and also freely pivots about a pivot such as clevis pin 118 which further connects the foot 113 to the lever bar 112. It will be appreciated that the ring 111 freely slides along support post 11 but is permanently attached or mounted to the support post 11, meaning the center post tire changing apparatus 10 does not require disassembly and reassembly of the bead breaker 110 in any manner, nor does it require detachment or reattachment of the bead breaker 110 in any manner. This is in contrast to prior art bead breakers attached to center post tire changers, wherein the operation of the tire changer necessarily required disassembly and reassembly or detachment and reattachment of the bead breaker.

In operation, the center post tire changing apparatus 10 is highly effective in breaking the bead of essentially any size tire from essentially any conventional wheel rim. Once the bead is broken, the apparatus 10 can be used to secure and hold the wheel for demounting the tire therefrom and/or for holding the wheel for mounting the tire thereto.

Figures 7A, 7B:
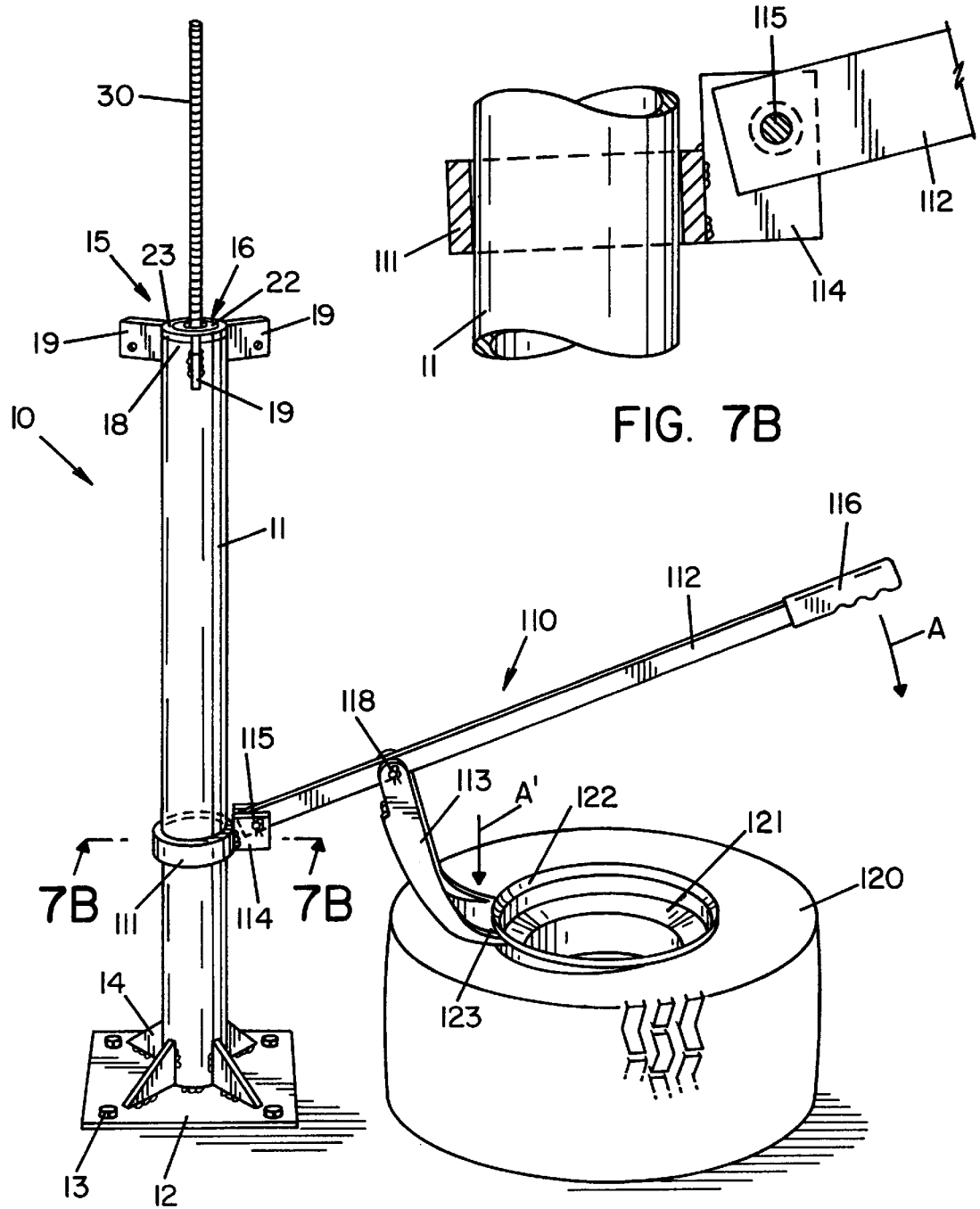
FIG. 7A is a perspective view of a center post tire changing apparatus according to the concepts of the present invention, further including a permanently mounted, continuously adjustable bead breaker wherein the bead breaker is shown breaking a bead of a tire away from a wheel rim.
FIG. 7B is enlarged, fragmentary view of the bead breaker, partially in section, and center post tire changing apparatus taken along the line 7B—7B.

The operation of breaking a bead of a tire from a rim of a wheel is essentially illustrated in FIG. 7A. With reference thereto, a tire 120 is shown mounted to a wheel 121 having a rim 122. To break the bead of the tire away from the rim 122, the tire is first laid flat on a floor or other surface and is positioned relative to the support post 11 such that the engaging edge 123 of the foot 113 contacts the wheel 121 between the tire 120 and the rim 122. It will be appreciated that the height of the bead breaker 110 can be adjusted and is continually adjusted to provide proper engagement of the engaging edge 123 between the rim 122 and the tire 120.

Once the foot 113 is properly engaged to the rim 122 and tire 120, the tire bead can be separated from the rim by applying manual force to the lever bar 112 at the grip 116 in the direction of arrow A. This, in turn, forces the bead breaker foot 113 downward in the direction of arrow A', thus breaking the tire bead away from the rim 122. The wheel 121 may be rotated and the manual application of force is repeated around the circumference of the wheel 121 until the entire tire bead is broken away from the rim 122. After the tire 120 is broken on one side thereof, it can be turned over and the same procedure is followed to break the tire away from the rim on the other side.

Generally, wider tires are accommodated by sliding ring 111 up support post 11, and narrower tires are accommodated by sliding ring 111 down support post 11. Tires of greater diameter are accommodated by moving the tire and wheel away from the support post 11, and tires of lesser diameter are accommodated by moving the tire and wheel closer to the support post 11. Thus the bead breaker is continuously adjustable for any type or size of tire. By "continuously adjustable" it is meant that the bead breaker can be set to any position within the range of sliding the ring 111 along support post 11, in contrast to prior art bead breakers wherein preset pin positions determine discrete bead breaker positions.

Once in position for breaking the tire away from the rim however, the ring 111 along support post 11 is locked due to the upward force exerted on bracket 114 by lever bar 112. The locking action of the ring 111 is illustrated in FIG. 7B, wherein the upward force on the bracket 114 pushes the ring 111 to a position slightly non-concentric with the support post 11.

Figure 8:
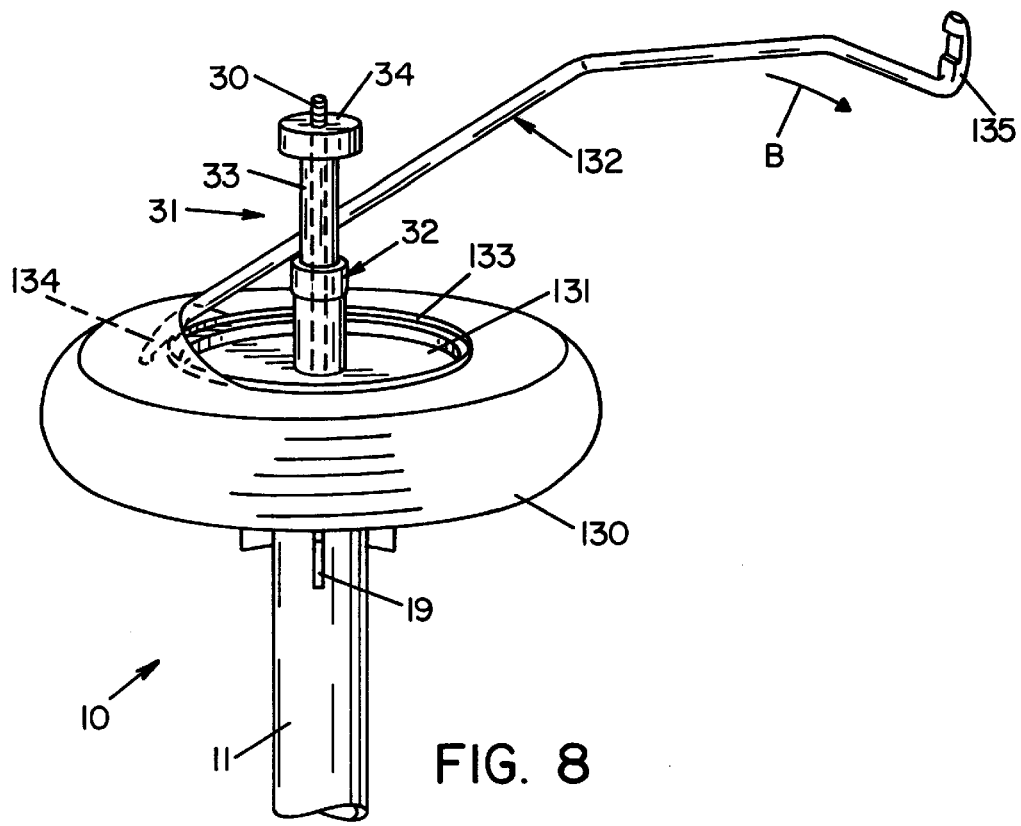
FIG. 8 is a partial perspective view of a center post tire changing apparatus having a tire and wheel securely mounted thereon, wherein the tire is being demounted from the wheel using a preferred tire mount and demount bar.

Once the tire is broken away from the rim, it can now be placed over the center post 30 of the tire changing apparatus 10 for demounting from the wheel. With reference to FIG. 8, one representative embodiment of a tire 130 and wheel 131 are shown mounted on the center post tire changing apparatus 10 as described hereinabove with the center post 30 extending through the center hole or hub aperture of the wheel 130. It will be appreciated that the manner in which the tire and wheel is mounted to the center post tire changing apparatus 10, and more specifically the type of wheel securing assembly employed depends upon the type of wheel being mounted. For representative purposes, a straight wheel 131 is shown mounted on center post tire changing apparatus 10 in FIGS. 8 and 9. Mounting of other types of wheels, including bearing wheels, ATV wheels, and four- and five-hole lug wheels has also been described hereinabove.

Demounting and mounting of the tire 130 from the wheel 131 is effectuated by use of the present invention in combination with a suitable tire iron such as mount/demount bar 132. Although any mount/demount bar suitable for mounting or demounting the tire 130 from the wheel 131 can be used in the present invention, it is preferred that a mount/demount bar such as the one shown in FIGS. 8 and 9 be employed. This bar 132 is commercially available from the assignee of record under the tradename Tire Snake™ and provides an improvement over prior art tire mount/demount bars to the extent that the angles employed by the bar 132 prevents it from "backing out" from between the tire and the wheel rim. A more detailed description of the tire mount/demount bar 132 is set forth in pending U.S. Ser. No. 08/961,975, the entire disclosure of which is hereby incorporated by reference.

With reference again to FIG. 8, demounting of the tire 130 from the wheel 131 is commenced with the securing of the wheel 131 to the center post tire changing apparatus 10 A working (demounting) end 134 of bar 132 is interposed between the tire bead and the wheel rim. The user then grasps the bar 132 proximate to the other end 135 and draws the bar toward center post 30. In the representative drawing of FIG. 8, it will be appreciated that the bar 132 is drawn against the spacer sleeve 33, which protects the center post 30 from deformation or damage during use, and is then pivoted around the center post 30. That is, the bar 132 contacts the sleeve 33 at a point along a portion of the bar which point will vary according to the diameter of the wheel, and forms a fulcrum or pivot point around which the bar 132 may be rotated. Accordingly, as the user pulls bar in the direction of arrow B (clockwise) around the center post 30, the tire bead is progressively slid over the wheel rim 133. It will be appreciated that a bar constructed of similar angles in the opposite directions may facilitate use of the bar in a counterclockwise direction for those users who require such an alternative.

It will be understood that this demounting operation usually occurs twice, once to remove the upper tire bead from the wheel and again to remove the lower tire bead from the wheel. The wheel can then be removed by disengaging the wheel securing assembly (32, 33, 34) from the center post 30 and lifting the wheel from the center post 30.

Figure 9:
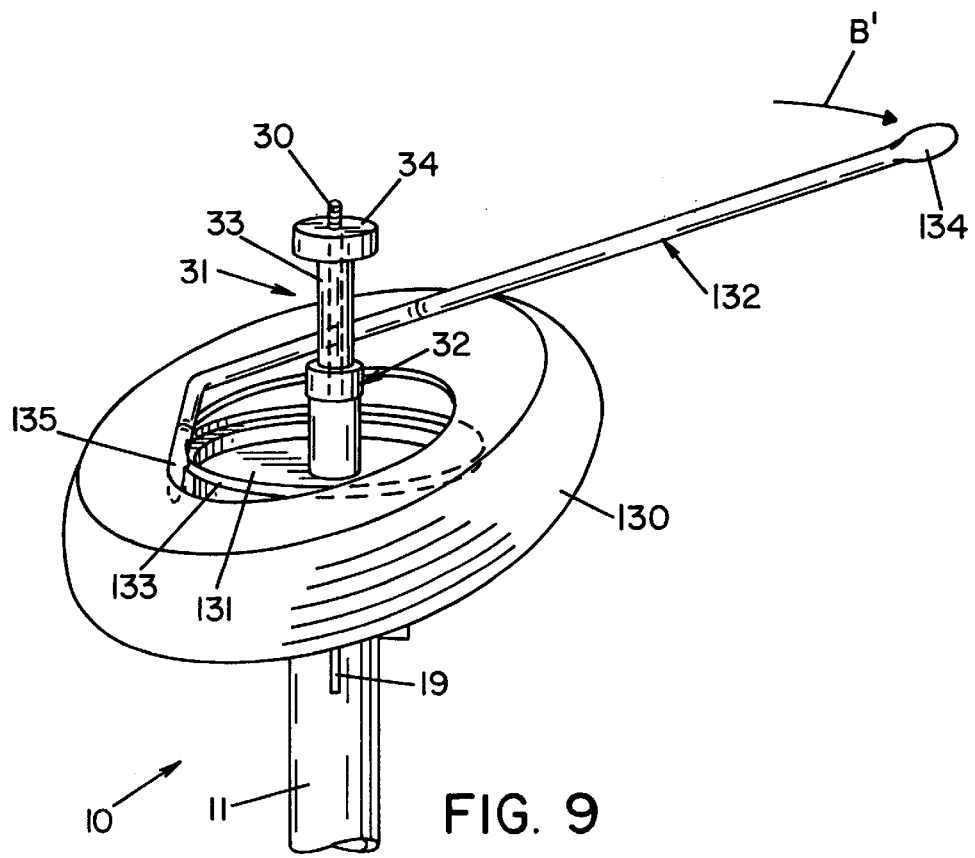
FIG. 9 is a partial perspective view of the center post tire changing apparatus of FIG. 8 having a wheel securely mounted thereon, wherein the tire is being mounted onto the wheel using the preferred tire mount and demount bar.

To mount a tire onto a wheel, the wheel rim from which a tire has just been removed can be used as mounted or an empty wheel rim can be appropriately mounted onto the center post tire changing apparatus 10 according to the description hereinabove. With reference to FIG. 9, a tire such as 130 is placed over the center post and onto the wheel rim, with the tire canted such that a portion of the top wheel rim edge and the center post 30 extends through the tire 130. This time, the mounting end 135 of bar 132 is interposed between the tire bead and the wheel rim. The user then grasps the bar 132 proximate to the other end 134 and draws the bar toward center post 30. In the representative drawing of FIG. 9, it will be appreciated that the bar 132 is drawn against the spacer sleeve 33, which protects the center post 30 from deformation or damage during use, and is then pivoted around the center post 30. That is, the bar 132 contacts the sleeve 33 at a point along a portion of the bar which point will vary according to the diameter of the wheel, and forms a fulcrum or pivot point around which the bar 132 may be rotated. Accordingly, as the user pulls bar in the direction of arrow B' (clockwise) around the center post 30, the tire bead is progressively slid back over the wheel rim 133. It will be appreciated that a bar constructed of similar angles in the opposite directions may facilitate use of the bar in a counterclockwise direction for those users who require such an alternative. Mounting of the upper tire bead is then completed in the same manner as the lower tire bead.

As can be appreciated from the description of the mounting and demounting of tires using the present invention, when using the center post 30 as a fulcrum or pivot point for application of force to mount or demount the tire, the tire mount/demount bar 132 exerts force on the center post 30 as well. The use of spacer sleeve 33 alone or in combination with long spacer sleeve 33a serves to protect the threads of center post 30 from damage due to the force of contact with the tire iron. In some cases, particularly when mounting and demounting tires from wheel rims greater than 12 inches in diameter, this force may be sufficient to deflect center post 20. For these larger size tires and rims, the present invention protects center post 30 from deflection through use of the post support barrel 63 as shown in FIGS. 4A, 4B, 6A, and 6B. That is, post support barrel 63 provides additional strength against and otherwise protects the center post 30 from deflection by use of the supporting tire mount/demount bar 132 and the force applied thereto. The large diameter of the post support barrel 63 in comparison to the sleeve 33 and relative to the center post 30 serves to dissipate the application force from the bar 132 through the flange 72 to hold down plate 61.

Figure 10:
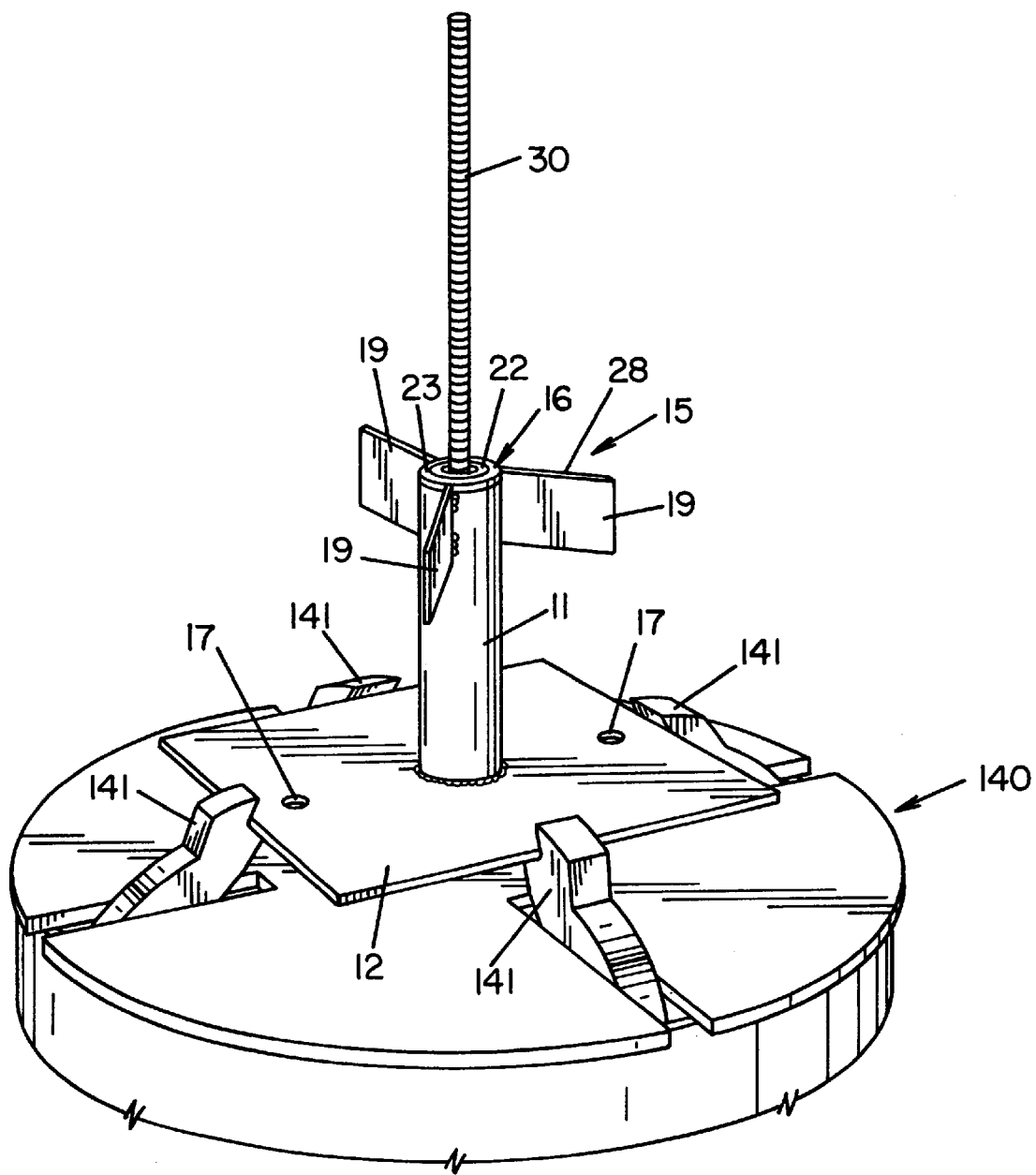
FIG. 10 is an alternative embodiment of a center post tire changing apparatus mounted in a rim-clamp machine.

In another embodiment, center post tire changing apparatus 10 may be mounted in a rim clamp machine such as 140 with grips 141 securing base plate 12 as illustrated in FIG. 10. This mounting orientation permits tire changing on a work bench and is particularly suited to small size tires and wheels. It will be understood that base plate 12 can be directly mounted onto a work bench surface using a suitable fastener such as bolts or nails through holes 17, or clamped as shown, or mounted by some other means known in the art. It will be appreciated, however, that this embodiment would not include a permanently mounted bead beaker attached to the support post 11 of the apparatus.

Thus it should be evident that the apparatus and methods of the present invention are highly effective in mounting and demounting all sizes of tires from wheel of all types, including bearing wheels, straight wheels, ATV wheels, and lug wheels. The invention is particularly suited for mounting and demounting tires, but is not necessarily limited thereto. The apparatus and method of the present invention can be used separately with other equipment, methods and the like, as well as for the mounting or demounting of other articles as might be known in the art.

Based upon the foregoing disclosure, it should now be apparent that the use of the tire changing apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, a wheel securing assembly according to the concepts of the present invention is not necessarily limited to those having each of the parts of the assemblies described herein. It will be understood that, if desired, only a hold down nut 34 could be used to securely hold the wheel in place. Further, the post support barrel 63, spacer sleeve 33, or bearing guide 32 could be threaded, thereby eliminating the need for any of the other parts of the wheel securing assemblies. Moreover, as noted hereinabove, other mount/demount bars can be substituted for the bar 132. Thus, the scope of the invention shall include all modifications and variations that may fall within the scope of the attached claims.

What is claimed is:

1. A center post tire changing apparatus for mounting or demounting a tire from a wheel, the apparatus comprising:

an elongated support post having a wheel support assembly disposed on one end of said support post;

a center post connected to and extending upwardly from said wheel support assembly and in coaxial alignment with said support post;

a wheel securing assembly disposed upon said center post, wherein the wheel is securely mounted on said center post between said wheel support assembly and said wheel securing assembly; and a plurality of fins extending radially from said support post.

2. The center post tire changing apparatus according to claim 1, wherein said wheel support assembly includes a first bearing guide having a flat contact surface and said wheel securing assembly includes a second bearing guide having a beveled surface proximate to said center post and the wheel such that when the wheel is securely mounted on said center post between said wheel support assembly and said wheel securing assembly, said axle is secured between said flat contact surface and said beveled surface.

3. The center post tire changing apparatus according to claim 1, wherein said wheel rests upon said plurality of fins of said wheel support assembly; and wherein said wheel securing assembly includes a hold down plate contacting only said wheel proximate to said center hole and a pin disposed through one of a plurality of lugholes in said wheel such that said pin rests against one of said plurality of fins.

4. The center post tire changing apparatus according to claim 3, wherein said hold down plate is a rectangular steel plate having a central aperture and two coplanar portions on opposing ends of said hold down plate distal to said aperture and a planar portion proximate to said aperture offset by bends between said planar portions.

5. The center post tire changing apparatus according to claim 1, wherein said center post is a threaded rod.

6. The center post tire changing apparatus of claim 1, wherein said center post tire changing apparatus is usable for mounting or demounting a tire from a wheel selected from the group including bearing wheels, straight wheels, ATV wheels, and automobile lug wheels.

7. The center post tire changing apparatus according to claim 1, further comprising a bead breaker secured to said support post.

8. The center post tire changing apparatus according to claim 7, wherein said bead breaker is continuously adjustable and permanently mounted on said post, said bead breaker including a ring slidably engaging said post, an elongated lever bar pivotably connected to said ring at one end, and a foot disposed medially on said lever bar.

9. The center post tire changing apparatus according to claim 8, wherein said post is the center post of the center post tire changing apparatus.

10. The center post tire changing apparatus according to claim 8, wherein said bead breaker is slidable on said post.

11. A center post tire changing apparatus for mounting or demounting a tire from a wheel, the apparatus comprising:

a elongated support post having a wheel support assembly disposed on one end of said support post;

a center post connected to and extending upwardly from said wheel support assembly and in coaxial alignment with said support post; and a wheel securing assembly disposed upon said center post, wherein the wheel is securely mounted on said center post between said wheel support assembly and said wheel securing assembly;

wherein said wheel support assembly includes a first bearing guide having a first recessed surface area proximate to said center post and the wheel and said wheel securing assembly includes a second bearing guide having a second recessed surface area proximate to said center post and the wheel.

12. The center post tire changing apparatus according to claim 11, wherein said wheel rests upon said first bearing guide of said wheel support assembly; and wherein said wheel securing assembly includes a lug hold down plate having a central aperture for receiving said center post, a pin secured to said plate and disposed through one of a plurality of lugholes in said wheel such that said pin rests against one of said plurality of fins.

13. The center post tire changing apparatus according to claim 12, wherein each of said lugholes have a raised periphery and wherein said hold down plate includes a recess distal from said pin such that said raised periphery of one of said lugholes is received by said recess.

14. A center post tire changing apparatus for mounting or demounting a tire from a bearing wheel having bearing races within the axle thereof, the apparatus comprising:

a elongated support post having a wheel support assembly disposed on one end of said support post;

a center post connected to and extending upwardly from said wheel support assembly and in coaxial alignment with said support post; and a wheel securing assembly disposed upon said center post, wherein the wheel is securely mounted on said center post between said wheel support assembly and said wheel securing assembly;

wherein said wheel support assembly includes a first bearing guide having a first recessed surface area proximate to said center post and the wheel and said wheel securing assembly includes a second bearing guide having second recessed surface area proximate to said center post and the wheel; and wherein the bearing races of the wheel are received within said recessed surface areas and do not contact any surface of said first bearing guide or said second bearing guide.

15. The center post tire changing apparatus according to claim 14, further comprising a bead beaker permanently secured to said support post and being continuously adjustable thereon.

* * * * *